(12) United States Patent
Lanary et al.

(10) Patent No.: US 8,025,501 B2
(45) Date of Patent: Sep. 27, 2011

(54) BURNER AND METHOD OF BURNING GAS IN A FURNACE

(75) Inventors: Roger Lanary, Shaftsbury (GB); Brian Foster, Broadstone (GB)

(73) Assignee: Hamworthy Combustion Engineering Limited, Dorset (GB)

( * ) Notice: Subject to any disclaimer, the term of this patent is extended or adjusted under 35 U.S.C. 154(b) by 242 days.

(21) Appl. No.: 12/081,430

(22) Filed: Apr. 16, 2008

(65) Prior Publication Data

US 2008/0261162 A1 Oct. 23, 2008

Related U.S. Application Data

(63) Continuation of application No. 10/639,593, filed on Aug. 13, 2003, now Pat. No. 7,429,173.

(30) Foreign Application Priority Data

Aug. 14, 2002 (GB) .................................. 0218907.4

(51) Int. Cl.
*F23C 9/00* (2006.01)
(52) U.S. Cl. ......... 431/116; 431/115; 431/174; 431/181
(58) Field of Classification Search ................. 431/5, 6, 431/9, 115, 116
See application file for complete search history.

(56) References Cited

U.S. PATENT DOCUMENTS

| | | | | |
|---|---|---|---|---|
| 1,899,926 A | * | 3/1933 | Burke | 432/143 |
| 4,128,065 A | * | 12/1978 | Kelly et al. | 110/211 |
| 4,243,372 A | * | 1/1981 | Cade | 431/31 |
| 4,395,224 A | * | 7/1983 | Cade | 431/31 |
| 4,445,842 A | * | 5/1984 | Syska | 431/115 |
| 4,945,841 A | * | 8/1990 | Nakamachi et al. | 110/341 |
| 4,995,807 A | * | 2/1991 | Rampley et al. | 431/9 |
| 5,073,105 A | * | 12/1991 | Martin et al. | 431/116 |
| 5,238,395 A | * | 8/1993 | Schwartz et al. | 431/10 |
| 5,269,678 A | * | 12/1993 | Schwartz et al. | 431/9 |
| 5,275,552 A | * | 1/1994 | Schwartz et al. | 431/10 |
| 5,284,438 A | * | 2/1994 | McGill et al. | 431/9 |
| 5,458,481 A | | 10/1995 | Surbey et al. | |
| 5,975,886 A | * | 11/1999 | Philippe | 431/165 |
| 5,980,243 A | | 11/1999 | Surbey et al. | |
| 6,261,089 B1 | * | 7/2001 | Aldo | 431/354 |
| 6,331,107 B1 | * | 12/2001 | Philippe | 431/285 |
| 6,347,935 B1 | * | 2/2002 | Schindler et al. | 431/5 |

(Continued)

*Primary Examiner* — Kenneth Rinehart
*Assistant Examiner* — Jorge Pereiro
(74) *Attorney, Agent, or Firm* — Stites & Harbison PLLC; Douglas E. Jackson

(57) ABSTRACT

A gas burner for use in a furnace and a method of burning gas in a furnace, especially but not exclusively a process furnace used in an oil cracking or refining process. The gas burner comprises two passageways with adjacent outlets. The first passage way is in fluid communication with a source of pressurized fuel gas and has an aperture through which recirculated flue gas can enter the first passageway and the second passageway is in fluid communication with a source of air. In operation, fuel gas is injected into the first passageway and recirculated flue gas is thereby drawn into the first passageway so that it mixes with the fuel gas. Fuel gas is partially combusted and a mixture of partially combusted fuel gas and recirculated flue gas flows up the first passageway and comes into contact with air from the second passageway and combusts. The use of recirculated flue gas keeps down the level of NOx emissions and as the recirculated flue gas is sucked into the first passageway by the pressurised fuel gas flow it is not necessary to provide complex pumping mechanisms.

13 Claims, 6 Drawing Sheets

U.S. PATENT DOCUMENTS

| | | |
|---|---|---|
| 6,394,792 B1 | 5/2002 | McDonald et al. |
| 6,499,990 B1 | 12/2002 | Zink et al. |
| 6,524,097 B2 * | 2/2003 | Hoke et al. ........................ 431/8 |
| 6,979,191 B1 | 12/2005 | Zink et al. |
| 7,303,388 B2 * | 12/2007 | Joshi et al. ...................... 431/10 |
| 2001/0034001 A1 * | 10/2001 | Poe et al. ...................... 431/116 |
| 2001/0049076 A1 * | 12/2001 | Schindler et al. .................. 431/5 |
| 2004/0248054 A1 * | 12/2004 | Poe et al. ...................... 431/116 |

* cited by examiner

REFINERY BURNER

BURNER AND METHOD OF BURNING GAS IN A FURNACE

CROSS REFERENCE TO RELATED APPLICATIONS

The present application is a continuation under 37 C.F.R. §1.53(b) of U.S. application Ser. No. 10/639,593, filed Aug. 13, 2003, now U.S. Pat. No. 7,429,173, and which claims priority under 35 U.S.C. §119 from GB Application 0218907.4 filed on Aug. 14, 2002, the entire contents of each of which are hereby incorporated by reference.

BACKGROUND OF THE INVENTION

1. Field of the Invention

The present invention relates to a gas burner for use in a furnace and a method of burning gas in a furnace, especially but not exclusively a process furnace used in an oil cracking or refining process.

2. Summary of the Prior Art

Generally such furnaces will have a single burner or an array of burners arranged on the furnace floor, each burner being supplied with a fuel gas which it burns in order to heat the furnace.

For environmental reasons it is desirable to keep the level of NOx emissions from the furnace as low as possible. It is known that NOx emissions from a burner can be reduced by recirculating flue gas (the gaseous products of combustion in the furnace) and mixing it with air in a windbox (located below the floor of the furnace) which supplies the combustion air flow to the burner. However, this requires large amounts of recirculated flue gas (RFG) and a large amount of energy to pump the recirculated flue gas into the windbox. There is a need for a more efficient way of reducing NOx emissions from a gas burner.

SUMMARY OF THE INVENTION

At its most general, the present invention proposes that fuel gas is mixed with flue gas from the furnace (hereinafter referred to as recirculated flue gas) before the two come into contact with the combustion air flow. This can be achieved by providing a burner with two separate passageways; one for mixing of fuel gas and recirculated flue gas and the other for air which is to combust with the fuel gas. Generally the two passageways will have adjacent outlets so that the two fluid flows will mix at the outlets to produce a flame.

Accordingly, a first aspect of the present invention may provide a gas burner for use in a combustion furnace, comprising a first passageway and a second passageway separate from the first, the two passageways having adjacent outlets, the first passageway being in fluid communication with a source of pressurized fuel gas and having an aperture through which recirculated flue gas can enter the first passageway, the second passageway being in fluid communication with a source of air.

In operation fuel gas is injected into the first passageway from the pressurized fuel gas source and recirculated flue gas (RFG) is drawn into the first passageway through said aperture in the first passageway so that it mixes with the fuel gas, the fuel gas partially combusts, and this mixture of partially combusted fuel gas and RFG flows out through the outlet of the first passageway where it comes into contact with air from the second passageway and combusts.

Because the recirculated flue gas is effectively sucked into the first passageway and entrained in the pressurized fuel gas flow, it is not necessary to provide complex pumping mechanisms to direct the recirculated flue gas into the first passageway. This makes the burner energy efficient compared to prior art designs in which recirculated flue gas was mixed with air in a wind box below the burner. Furthermore, as the recirculated flue gas is mixed directly with the fuel gas before it comes into contact with the combustion air flow from the second passageway, smaller amounts of recirculated flue gas are needed in order to achieve the desired reduction in NOx emissions. Indeed, the present invention may provide a lower level of NOx emissions than was previously possible.

The fuel gas can be any combustable gas or mixture of combustable gases. The burner may be constructed from any suitable material (e.g. refractory material, ceramic fibre, metal, or a refractory material lined with metal). In general the refractory part of the burner is known as the 'quarl'.

The burner may be built into the floor of the furnace in which it is to be used. The furnace may have several burners, each in accordance with the present invention. Generally the furnace will have a single burner or an array of burners arranged on the furnace floor.

The structure and operation of the, or each, burner will now be described in more detail.

Preferably, the source of pressurized fuel gas is a gas injector tube which extends into the first passageway of the burner. It is arranged to direct pressurized (in one embodiment 0.5-2.5 bar) fuel gas into the first passageway. The outlet of said gas injector tube forms the inlet for pressurized fuel gas into the first passageway.

Preferably, the aperture through which recirculated flue gas (RFG) can enter the first passageway is an aperture located in an exposed side wall of the first passageway (i.e. a sidewall which is exposed to the furnace). This sidewall may be an outer wall of the burner. This helps entrainment of recirculated flue gas into the flow of pressurised fuel gas in the first passageway. As the aperture then opens directly to the furnace flue gas present in the atmosphere of the furnace can be drawn directly into the first passageway.

Alternatively the aperture may be at a first end of the first passageway (e.g. opposite the outlet end). In this case said first end of the passageway is preferably removed from the floor of the furnace so that RFG between the floor of the furnace and the first end of the first passageway can be sucked up directly into the first passageway.

Preferably, the aperture in the first passageway is located below (upstream of) the inlet of pressurized fuel gas into the passageway. This tends to cause recirculated flue gas to be sucked into the first passageway and also helps to avoid loss of fuel gas through the aperture.

Preferably the first passageway tapers to narrow downstream of the inlet of pressurized fuel gas into the first passageway. This causes a reduction in fluid pressure before the gases leave through the outlet of the first passageway.

Preferably said tapering forms a venturi.

In one embodiment the venturi takes the form of a gradual narrowing of the first passageway to a constricted section, of lower cross-sectional area, leading to the outlet. While it is usual for venturis to widen again after their constricted portion, it has been found that in a burner according to the present invention the passageway does not need to widen again before the outlet. Thus the outlet of the first passageway can be at the end of the constricted portion and the size of the burner can be kept low.

Preferably the aperture through which RFG can enter the first passageway is located in the vicinity of said tapering or said venturi. This has the effect of causing recirculated flue gas in the furnace to be sucked in through the aperture due to the reduced pressure in the narrower section of the passageway when gas is flowing though the first passageway.

Preferably there are one or more additional passageways (e.g. a third passageway and a fourth passageway etc) for mixing fuel gas and recirculated flue gas (RFG). Each such additional passageway has an aperture for recirculated flue gas, is in fluid communication with a source of pressurized fuel gas and has an outlet adjacent the outlet of the second passageway (which is for channelling the flow of combustion air).

Each additional fuel gas/RFG passageway may have any of the features of the first passageway described above.

Preferably the walls of the second passageway are arranged in an octagonal structure. This allows for convenient placement of the fuel gas/RFG passageways adjacent the second passageway. Alternatively the second passageway can be circular in cross-section.

In one preferred embodiment there are two passageways for mixing fuel gas and recirculated flue gas. In another preferred embodiment there are four such passageways.

Furnaces tend to work on a continuous cycle. So, for example, once the process has been started, the furnace may only need to be relit infrequently. So, under normal operating conditions, the furnace will already be at the appropriate temperature (e.g. 500-900.degree.C. for refinery, 1000-1300.degree.C. for a cracker) and the mixture of fuel gas and RFG will combust when it comes into contact with the combustion air flow. However, when the furnace is started for the first time, or after a period of non-use, it will be cold. Accordingly when the furnace is first started the air passageway (the second passageway) in the or each burner will be cold and the air in the furnace will not be at the appropriate temperature for combustion.

Accordingly, the second passageway is preferably provided with a source of fuel gas (e.g. a 'pilot' burner gas tube comprising an ignitor and a tube for supplying fuel gas) and optionally one or more additional pipes for injecting fuel gas—often referred to as 'inner' burner gas tubes). This source of fuel gas is used to provide fuel gas for combustion in the second passageway when the furnace is first started. Combustion in the second passageway quickly heats up the second passageway and the air flowing through it, so that eventually the second passageway (and the furnace) is at the desired temperature and it is no longer necessary to provide fuel gas for combustion in the second passageway. At this point the source of fuel gas for the second passageway is reduced or turned off.

Preferably the second passageway is provided with a pressure plate (e.g. a plate with a plurality of apertures through it) which decreases the pressure of the air flow in the second passageway prior to its reaching the outlet of the second passageway.

Preferably the outlet or outlets of the fuel gas source for the second passageway is/are at the same level as, or close to, the pressure plate. Preferably the second passageway has a larger cross-sectional area downstream of the pressure plate than upstream of the pressure plate, so that there is a ledge around the level of the pressure plate and outlet(s) of the fuel gas source for the second passageway. This allows the fuel gas to settle on the ledge where it combusts to heat the second passageway.

A second aspect of the present invention may provide a method of burning a fuel gas in a furnace comprising the steps of mixing a fuel gas with recirculated flue gas in a first passageway in a gas burner to cause partial combustion of the fuel gas and channelling air through a second passageway in the burner, separate to the first passageway, so that air from the second passageway mixes and combusts with the partially combusted fuel gas and recirculated flue gas from the first passageway, at a location downstream of the burner and within the furnace. Thus the fuel gas is mixed with recirculated flue gas before it comes into contact and combusts with the flow of combustion air; this may result in a low level of NOx emissions.

In order to achieve this it is necessary to keep the flow of combustion air separate from the fuel gas and RFG until the fuel gas and RFG have been mixed together. As there will be some oxygen present in the RFG, mixing of RFG with fuel gas in the first passageway causes partial combustion of the fuel gas in the first passageway. However, the mixture of RFG and fuel gas is only mixed and combusted with the main flow of combustion air after it has left the burner. This is done by using two separate passageways: a first for mixing the fuel gas and RFG, and a second for the flow of combustion air. Preferably the outlets of said first and second passageways (which lead to the furnace) are adjacent to each other so that the gases flowing through the passageways contact each other soon after leaving said outlets. Since the passageways are separate, up to and including their outlets to the furnace from the burner, there is no mixing of air from the second passageway with the mixture of RFG and fuel gas inside the burner, only in the furnace.

Preferably the burner is located on the furnace floor.

Preferably the recirculated flue gas (RFG) is drawn into the first passageway by the flow of fuel gas in the first passageway (i.e. it is entrained into the fuel gas flow). This arrangement is particularly energy efficient as it means it is not necessary to pump recirculated flue gas into the first passageway.

Preferably the fuel gas is injected into the first passageway through a fuel gas injector tube provided in the first passageway. Preferably, the fuel gas is pressurized as this helps entrainment of the RFG into the fuel gas flow. In one embodiment the fuel gas is injected at 0-2½ bar.

Preferably the recirculated flue gas is allowed to flow into the first passageway through an aperture provided in the first passageway.

Preferably the aperture is in an exposed sidewall of the first passageway; in this way flue gas can enter through the aperture directly from the furnace. The aperture may alternatively be located at an end of the passageway other than the outlet end; in this case there is preferably a gap between said end and the floor of the furnace so that flue gas can enter the aperture directly from the furnace.

Preferably the fuel gas is injected into the first passageway downstream of the point at which RFG enters the first passageway. This helps to prevent fuel gas from flowing out through the inlet and may also help generate a suction effect which draws RFG into the first passageway.

Preferably the first passageway tapers to narrow downstream of the point at which the fuel gas enters the first passage. Preferably this tapering forms a venturi. Preferably the RFG enters the first passageway in the vicinity of a narrowed region formed by said tapering or said venturi. In this way, when gas flows through the first passageway, there is a drop in pressure at the venturi or tapered portion and recirculated flue gas is drawn into the first passageway by this drop in pressure.

Preferably fuel gas is mixed with recirculated flue gas in a plurality of separate passageways (e.g. first, third, fourth and fifth passageways), and the mixture of gases flowing from the outlets of these fuel gas/RFG passageways flows to a combustion region, within the furnace and downstream of the burner, where it combusts with the flow of air from the second passageway. These passageways may have any of the features of the first passageway mentioned above.

As the furnace will be cold when it is first started it will be necessary to heat the second passageway at the start of the process, so as to provide a flow of combustion air at a temperature suitable for combustion with the fuel gas. Thus when the combustion process is first started, it is preferable to inject some fuel gas into the second passageway to cause combustion in the second passageway. When the passageway has reached the desired temperature, injection of fuel gas into the second passageway can be reduced or stopped.

BRIEF DESCRIPTION OF THE DRAWINGS

Two embodiments of the present invention will now be described by way of example only, with reference to the accompanying drawings in which.

DETAILED DESCRIPTION

Figure 1:
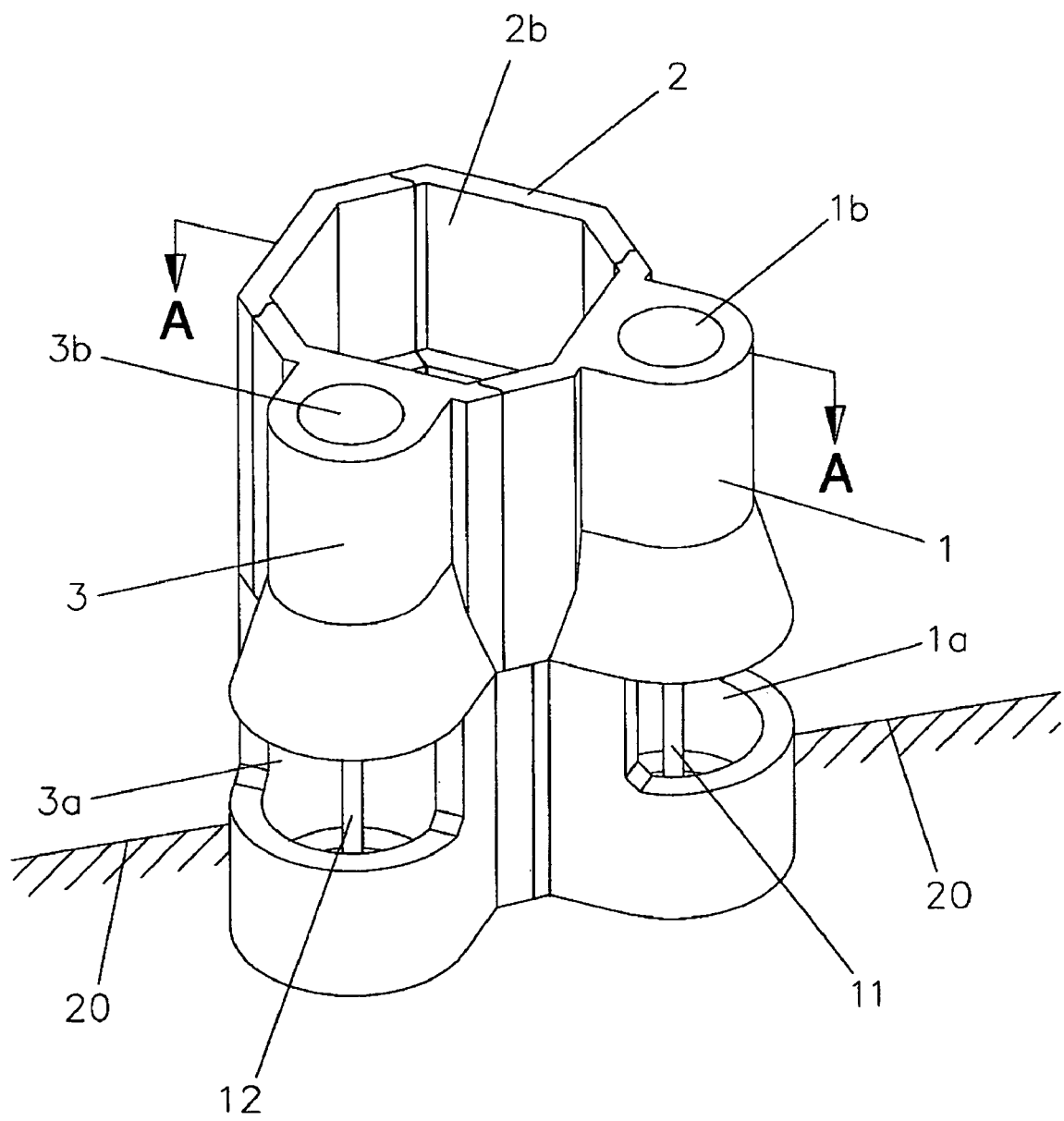
FIG. 1 is a perspective view of a burner according to a first embodiment of the present invention.

FIG. 1 is a perspective view of a burner according to a first embodiment of the present invention. The burner 10 is set into the furnace floor (the level of which is indicated by reference numeral 20) and defines three passageways 1, 2 and 3.

The first and third passageways 1, 3 have apertures 1a, 3a into which recirculated flue gas (RFG) from the furnace can flow and outlets 1b, 3b which gas flowing through the first and third passageways can flow out of. The first and third passageways 1,3 also contain gas injector tubes 11, 12 for injecting pressurized fuel gas at a pressure of 2 to 2.5 bar into the first and third passageways respectively. It is noted that while the term recirculated flue gas (RFG) is used herein, this gas is more properly referred to as gas from the interior of the furnace since, as is evident from the drawings, the gas in question is internal furnace gas, e.g., gas in the area adjacent to apertures 1a, 3a, and this gas does not come from the furnace flue (which is not shown in the drawings) and is not recirculated gas. The interior of the furnace is perhaps best shown in FIG. 4 which is discussed below and which shows three side walls of the furnace.

The burner's second passageway 2 is for channeling air which is to combust with fuel gas from the first and third passageways 1, 3. The second passageway 2 is octagonal in shape (and has octagonal outer walls) and the first and third passageways 1, 3 are provided adjacent to its walls. Thus as can be seen in FIG. 1, the outlets 1b, 3b of the first and third passageways are adjacent to the outlet 2b of the second passageway. The second passageway 2 has an inlet 2a which is in fluid communication with a wind box 30 (shown in FIG. 3). The windbox 30 located below the burner 10 and provides a source of air for the second passageway 2.

Figure 2:
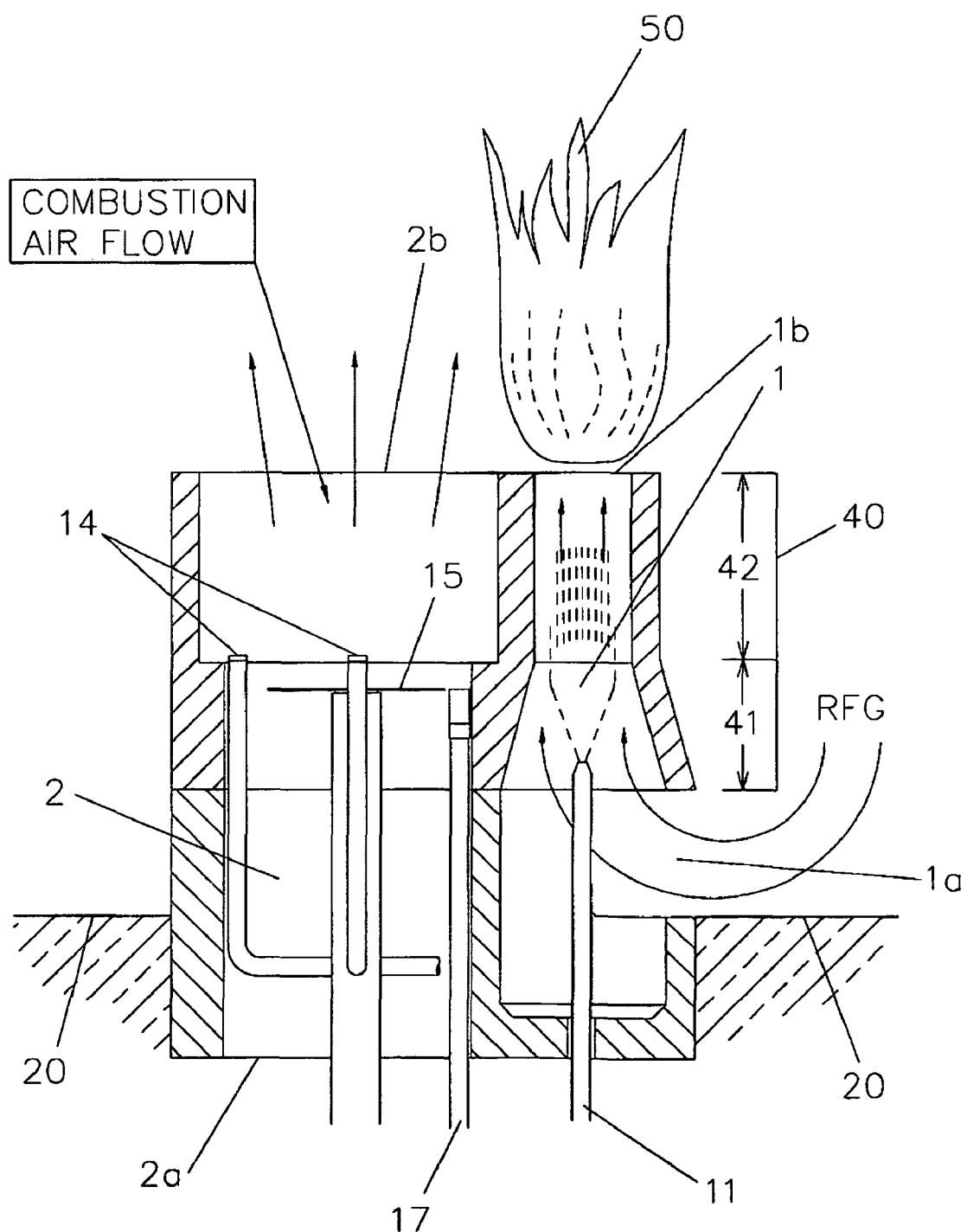
FIG. 2 is a cross-sectional view of the first embodiment of the present invention, showing the air passageway and one of the fuel gas/RFG passageways.
Figure 3:
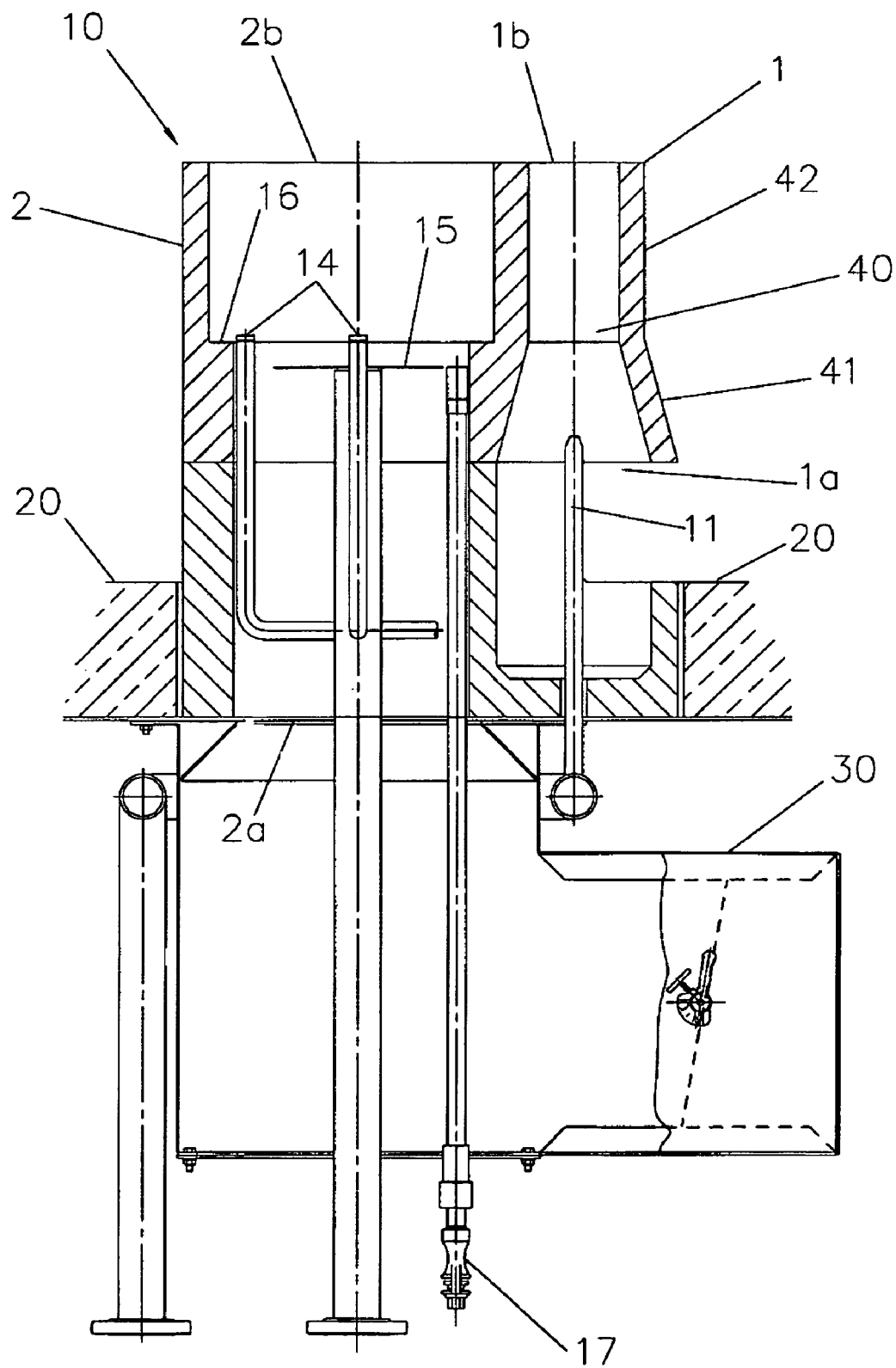
FIG. 3 is a cross-sectional view of the first embodiment of the present invention, showing the burner and a windbox provided below the burner.

FIG. 2 is a cross sectional view of the burner 10 along the line A-A of FIG. 1; as such it shows only the first 1 and second 2 passageways. FIG. 3 is also a cross section and shows the windbox 30 as well as the burner 10. As can be seen from FIG. 2 (and FIG. 3), the aperture 1a of the first passageway is provided in the side wall of the first passageway (which is an exposed sidewall, i.e. an outer wall of the burner, and thus provides direct communication with the atmosphere of the furnace). The aperture 1a extends approximately 180.degree. around the side wall of the first passageway and extends upwardly from the level of the furnace floor 20. It is shaped and positioned so as to facilitate the flow of recirculated flue gas (RFG) into the first passageway; the direction of flow of RFG when the burner is in operation is shown by the arrows in FIG. 2.

As previously mentioned, the first passageway 1 also has a gas injector tube 11 which injects pressurized fuel gas into the first passageway. The outlet of the gas injector tube 11 provides the inlet for fuel gas into the first passageway and is located above (downstream) of the aperture 1a and directs fuel gas upwardly into the first passageway 1 at a pressure of 0-2.5 bar. As the outlet of the gas injector tube 11 is located above (downstream) of the aperture 1a, fuel gas does not flow out of the aperture 1a and the flow of pressurized fuel gas up the first passageway tends to cause a suction effect which draws recirculated flue gas (RFG) into the first passageway so that it is entrained into the flow of fuel gas and mixes with the fuel gas in the first passageway.

As the RFG will contain some oxygen, some combustion will occur in the first passageway when the fuel gas and RFG are mixed (i.e. the fuel gas to partially combusts in the first passageway).

The first passageway tapers to form a venturi region 40 just downstream of the aperture 1a. As can be seen in FIGS. 1 to 3, the venturi 40 comprises a first region 41 in which the first passageway gradually narrows in cross sectional area and after this a "constricted" section in which the cross sectional area of the passageway remains constant and is less than the cross sectional area of the passageway upstream of (below) the venturi. The outlet of the gas injector tube 11 is located just inside the tapering region 41, at a wider part thereof. It is important that the pressurized fuel gas passes through the venturi 40.

In operation of the burner, pressurized fuel gasses injected from the tube 11 and flows through the venturi 40. As the fuel gas flows through the venturi 40 its pressure drops due to action of the venturi 40 and this causes recirculated flue gas to be drawn in through the inlet 1a just upstream of the venturi and to mix with the fuel gas in the venturi. The mixed fuel gas and recirculated flue gas passes out of the first passageway through the outlet 1b which is adjacent to the outlet 2b of the second passageway 2.

Air from the wind box 30 enters into the second passageway 2 through the inlet 2a of the second passageway and is channeled through the passageway so that it passes out of the outlet 2b. This flow of combustion air from the second passageway then meets with the flow of mixed fuel gas and RFG from the first passageway (and also fuel gas and RFG from the third passageway which is the same as the first passageway already described) and combusts to produce a flame 50. The flame will initially be over the first and third passageways but may grow to extend over the outlet 2b of the second passageway as well.

As RFG is drawn into the first (and third) passageways 1, 3 by venturi action and entrainment in the fuel gas flow, it is not necessary to provide pumps for directing the RFG into the burner.

When the furnace is used for the first time, or for the first time after a period of inactivity, the second passageway 2 will be cold. In order to start the combustion process it is desirable to heat up the second passageway to a temperature suitable for the particular type of furnace (e.g. 500.degree.C. to 900.degree.C. for a refinery furnace, 1000.degree.C. to 1300.degree.C. for a cracker furnace). Therefore the second passageway is provided with a pilot gas injector tube 17 and inner burner gas tubes 14 for injecting fuel gas (which may be pressurized) into the second passageway. These inner fuel gas injector tubes 14 have outlets around the level of a pressure plate 15 which lies across an upper part of the second passageway 2. The pilot gas injector tube 17 has an outlet below the level of this pressure plate 15 and an ignitor for igniting fuel gas leaving the tube. The pressure plate 15 has a plurality of apertures 19, which may be arranged in lines extending radially from the pressure plate center. As air passes through the pressure plate it reduces in pressure. The cross sectional area of the second passage 2 widens downstream of (above) the pressure plate 15 and gas from the injector tubes 14 tends to sit around a ledge 16 in the second passage at the level of the pressure plate 15 and to combust there.

Once the second passage has been heated to the desired temperature, the gas injector tubes 14 are turned off. As the furnaces tend to work on a continuous cycle and only need be restarted infrequently, the pilot and inner gas injector tubes rarely need to be used.

Figure 4:
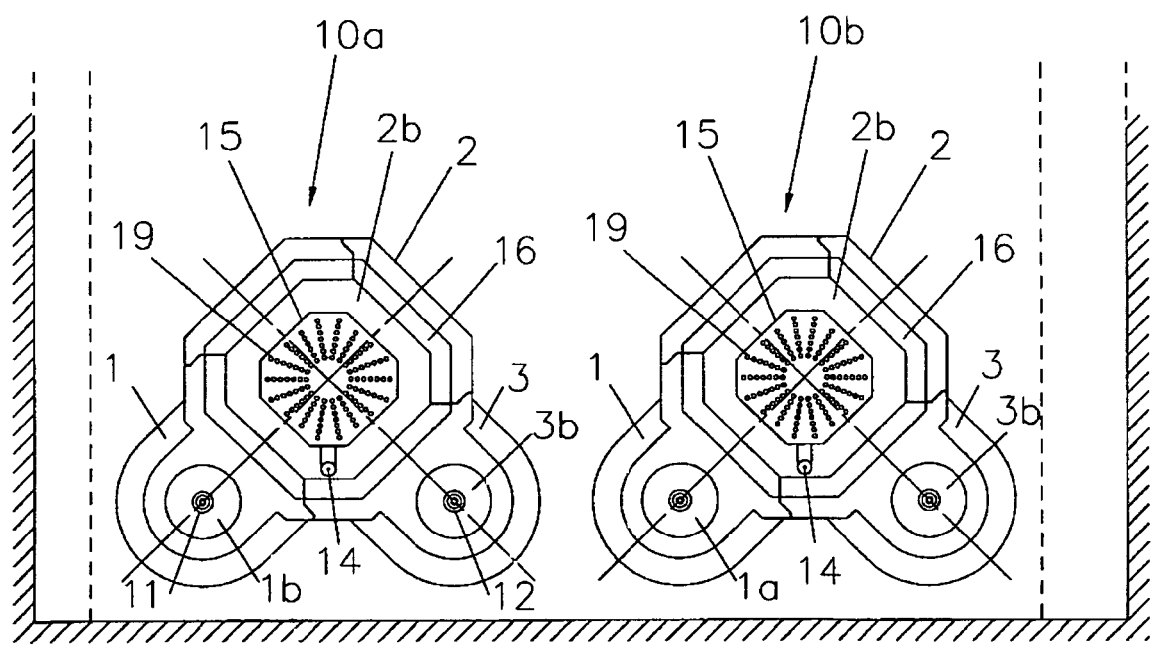
FIG. 4 is a plan view of the first embodiment of the present invention.

FIG. 4 is a plan view of a furnace having two burners 10*a* and 10*b*, each burner according to the first embodiment of the present invention. The burners are built into the floor of the furnace and as can be seen in FIG. 4, the fuel gas/RFG passageways (the first and third passageways 1, 3) of the burners are aligned against one wall of the furnace. Burners with this configuration of passageways shown in FIG. 4 are known as up-the wall burners as they can be arranged in a line so that the outlets to the fuel gas/RFG passageways extend in a straight line along one of the walls of the furnace.

It can also be seen from FIG. 4 that the second passageway has an octagonal cross section as does the pressure plate 15 therein. This octagonal structure is convenient and is easier to manufacture than, for example, a circular passageway. It also has the advantage of aligning the first and third passageways 1, 3 in the desired position and allows for thin walls to the second passageway 2 so that the outlets of the first and third passageways 1*b*, 3*b* can be close to the outlet of the second passageway 2*b*. In this way the combustion air flow from the second passageway easily combines with the fuel gas/RFG flow from the other passageways.

A second embodiment of the present invention will now be described. While the burner of the first embodiment has two fuel gas/RFG passageways, the second embodiment of the present invention has four such passageways. In other respects it is the same as the first embodiment of the present invention.

Figure 5:
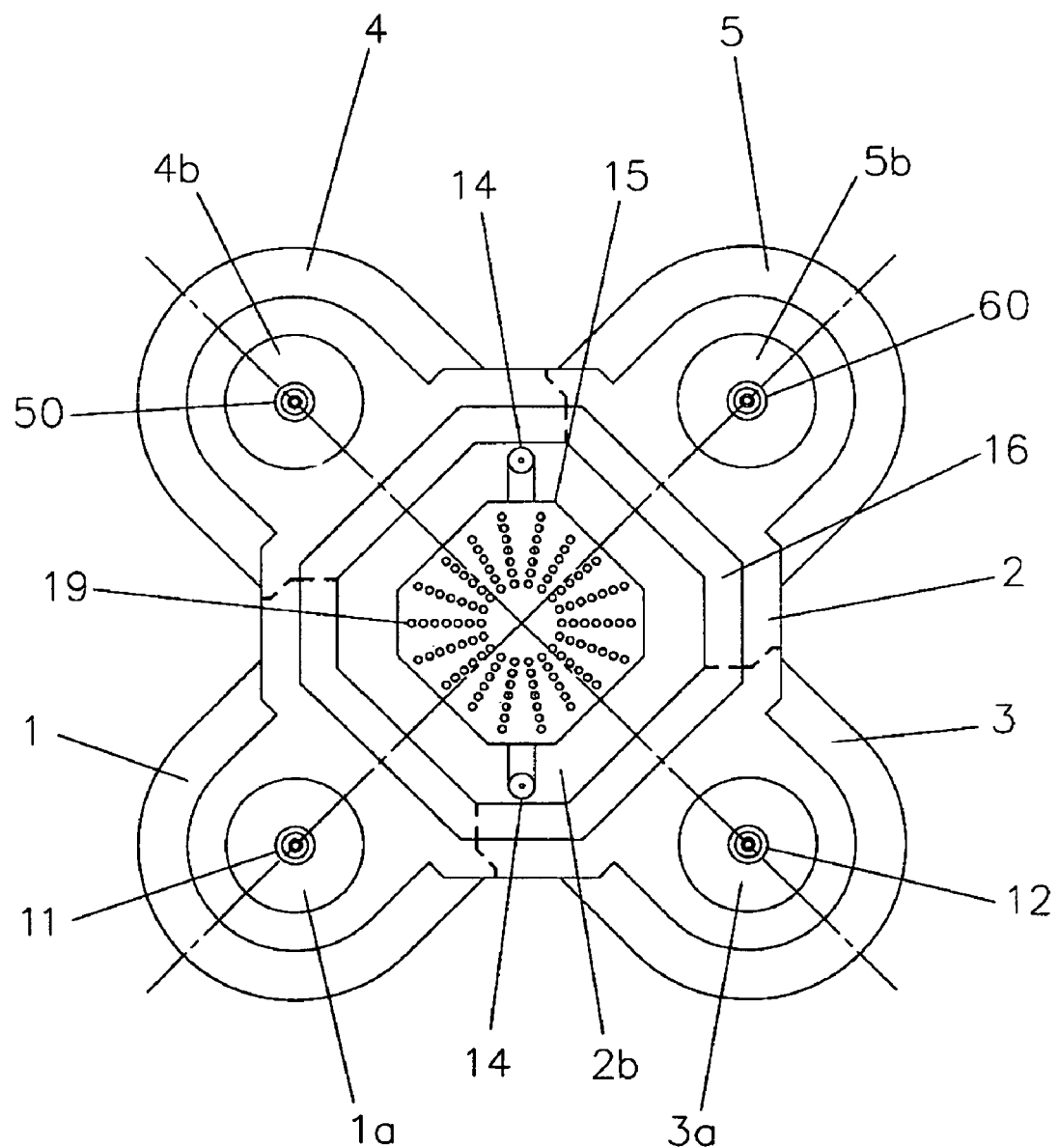
FIG. 5 is a plan view of the second embodiment of the present invention.

FIG. 5 is a plan view of a burner according to the second embodiment of the present invention. The second passageway 2 has the same octagonal structure as the second passageway in the first embodiment, but there are now four fuel gas/RFG passageways, 1, 3, 4, 5 arranged against the sides of the second passageway 2 such that the outlets of these passageways 1*b*, 3*b*, 4*b*, 5*b* are adjacent to the outlet of the second passageway 2*b*. As can be seen from FIG. 5, the second passageway 2 has four larger sides and four shorter sides, the larger sides being orientated at 90.degree. to each other. The fuel gas/RFG passageways are adjacent the larger sides of the octagon. Each fuel gas/RFG passageway has a pressurized fuel gas injection tube 11, 12, 50, 60.

Figure 6:
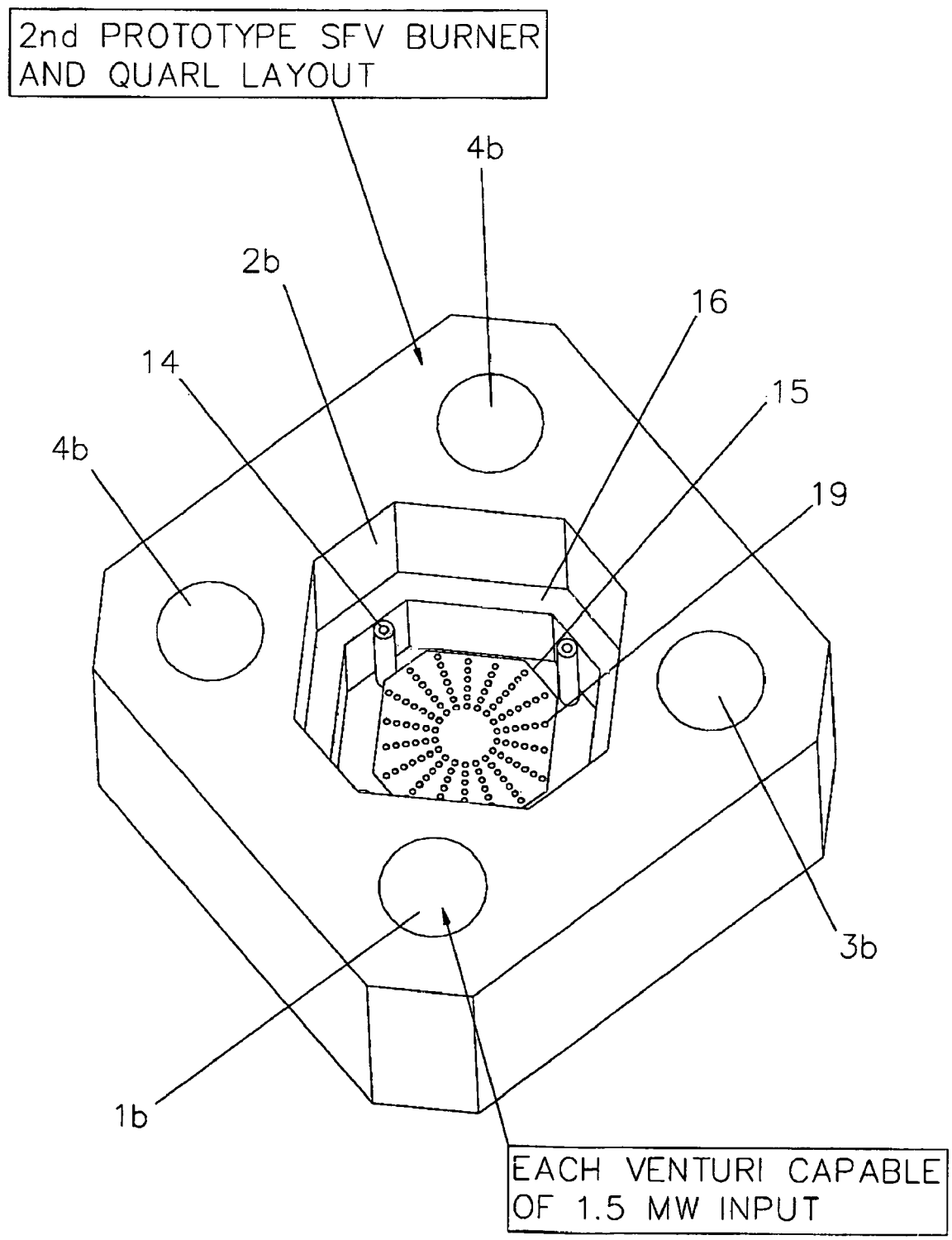
FIG. 6 is a perspective view from above of the second embodiment of the present invention.

FIG. 6 is a perspective view from above of a burner according to the second embodiment. FIG. 6 shows the outlets of the first, third, and fifth, fuel gas/RFG passageways 1, 3, 4, 5 (all of which have RFG inlets and described above in the first embodiment, but these inlets are not shown in the FIG. 6); which are adjacent the outlet 2*b* of the second passageway. The second passageway has a pressure plate 15 and ledge 16 at its upper portion and the outlets of the fuel gas injection tubes 14 of the second passageway are at the level of the pressure plate 15 as described above for the first embodiment.

Burners having four RFG/fuel gas passageways, arranged around the combustion air passageway 2, as shown e.g. in FIGS. 5 and 6, are known as refinery burners as they are suitable for use in a refinery furnace.

The above two embodiments have been given by way of example only and variations and modifications thereto are possible while remaining within the scope of the invention as defined by the appended claims, as interpreted by the description and drawings.

What is claimed is:

1. A combustion furnace comprising:
   a hollow interior which, during a normal operation of the furnace, is at a desired operating temperature;
   a floor at the bottom of the hollow interior;
   a source of pressured fuel gas;
   a source of combustion air;
   a gas burner adjacent the floor for combusting the fuel gas and combustion air, the gas burner including
      (a) a first passageway having
         a fuel gas outlet therein in fluid communication with the source of pressured fuel gas whereby the fuel gas required during normal operation of the furnace is injected from the fuel gas outlet and into the first passageway,
         an aperture disposed within the hollow interior and adjacent the floor and through which furnace gas from the hollow interior enters the first passageway and mixes with the injected fuel gas to form a mixture thereof, and
         a first outlet through which the mixture of furnace gas and fuel gas exits the first passageway, and
      (b) a second passageway separate from the first passageway having
         an inlet in fluid communication only with the source of combustion air during the normal operation so that only combustion air enters the second passageway during the normal operation, and
         a second outlet adjacent but separate from the first outlet, from which only combustion air exits the second passageway during the normal operation; and
   a combustion zone, located completely downstream of the gas burner and in the hollow interior, the combustion zone providing, during the normal operation and downstream of the gas burner, an initial mixing of the mixture of furnace gas and fuel gas exiting from the first outlet of the first passageway with only combustion air exiting from the second outlet of the second passageway so that a flame is produced by the combustion thereof only at a location downstream of the gas burner.

2. A combustion furnace according to claim 1, wherein the aperture for the furnace gas in the first passageway is provided in an exposed side wall of the first passageway.

3. A combustion furnace according to claim 1, wherein the aperture in the first passageway is located upstream of the fuel gas outlet in the first passageway.

4. A combustion furnace according to claim 1, wherein the first passageway narrows down to form a tapered portion downstream of the fuel gas outlet in the first passageway.

5. A combustion furnace according to claim 4, wherein the tapered portion of the first passageway forms a venturi.

6. A combustion furnace according to claim 5, wherein the venturi comprises a narrowing portion in which the cross sectional area of the first passageway narrows, and, downstream of the narrowing portion, a constricted portion in which the cross sectional area remains constant and is smaller than the cross sectional area of the first passageway upstream of the venturi.

7. A combustion furnace according to claim 6, wherein the first outlet of the first passageway is at the end of the constricted portion.

8. A combustion furnace according to claim 4, wherein the aperture in the first passageway is located in the vicinity of the tapered portion of the first passageway.

9. A combustion furnace according to claim 1, wherein the first gas outlet is a gas injector tube which extends into the first passageway of the burner.

10. A combustion furnace according to claim 1, wherein the first passageway is one of a plurality of first passageways for mixing fuel gas and furnace gas, each of the plurality of first passageways having an aperture for gas from the hollow interior of the furnace, being in fluid communication with a source of pressurized fuel gas, and having a first outlet adjacent to the second outlet of the second passageway.

11. A combustion furnace according to claim 1, wherein walls form the second passageway and the walls are arranged in an octagonal structure.

12. A combustion furnace according to claim 1, further including a pilot gas outlet in the second passageway which is connected to a fuel supply, the pilot gas outlet (i) being turned off during normal operation of the furnace, and (ii) being turned on only to effect a preheating of the second passageway.

13. A combustion furnace according to claim 1, wherein the first passageway, the first outlet, the second passageway, the second outlet are substantially vertically oriented whereby the fuel gas vertically exits the first passageway, the combustion air vertically exits the second passageway, and the combustion zone is thus located completely vertically downstream of the gas burner.

* * * * *